(12) United States Patent
Preuss

(10) Patent No.: US 8,425,848 B2
(45) Date of Patent: Apr. 23, 2013

(54) NEEDLE REACTOR

(75) Inventor: Klaus Preuss, Lengnau (CH)

(73) Assignee: Premex Reactor AG, Lengnau (CH)

( * ) Notice: Subject to any disclaimer, the term of this patent is extended or adjusted under 35 U.S.C. 154(b) by 0 days.

(21) Appl. No.: 13/202,491

(22) PCT Filed: Feb. 20, 2009

(86) PCT No.: PCT/CH2009/000072
§ 371 (c)(1),
(2), (4) Date: Nov. 1, 2011

(87) PCT Pub. No.: WO2010/094144
PCT Pub. Date: Aug. 26, 2010

(65) Prior Publication Data
US 2012/0053314 A1 Mar. 1, 2012

(51) Int. Cl.
*C08F 2/01* (2006.01)
*C08F 210/06* (2006.01)
*C08F 10/02* (2006.01)
*B01J 19/18* (2006.01)
*C08F 10/06* (2006.01)

(52) U.S. Cl.
USPC .......... 422/131; 422/135; 526/351; 526/352; 526/348

(58) Field of Classification Search .................. 422/131, 422/135; 526/351, 352, 348
See application file for complete search history.

(56) References Cited

FOREIGN PATENT DOCUMENTS

| | | |
|---|---|---|
| DE | 200 18 916 | 3/2002 |
| GB | 1 350 487 | 4/1974 |
| WO | 02/052279 | 7/2002 |
| WO | WO 02/052279 | * 7/2002 |

* cited by examiner

*Primary Examiner* — William Cheung
(74) *Attorney, Agent, or Firm* — Greenblum & Bernstein, P.L.C.

(57) ABSTRACT

A multi-chamber reactor (1) comprises an outer chamber (2) and at least one inner chamber (3), wherein the at least one inner chamber (3) is formed by a reactor/liner (6), which is closed by a closure (7), in particular a septum or a disk that can be penetrated with a needle, and the outer chamber is an autoclave, wherein the autoclave is composed of an autoclave body (4) and an autoclave cover (5), wherein the autoclave cover (5) has at least one first opening (8) for a needle (9), and preferably a second opening (10), which opens into the outer chamber. Said multi-chamber reactor (1) is suited for carrying out reactions with positive or negative pressure and under complete exclusion of air and/or moisture.

28 Claims, 1 Drawing Sheet

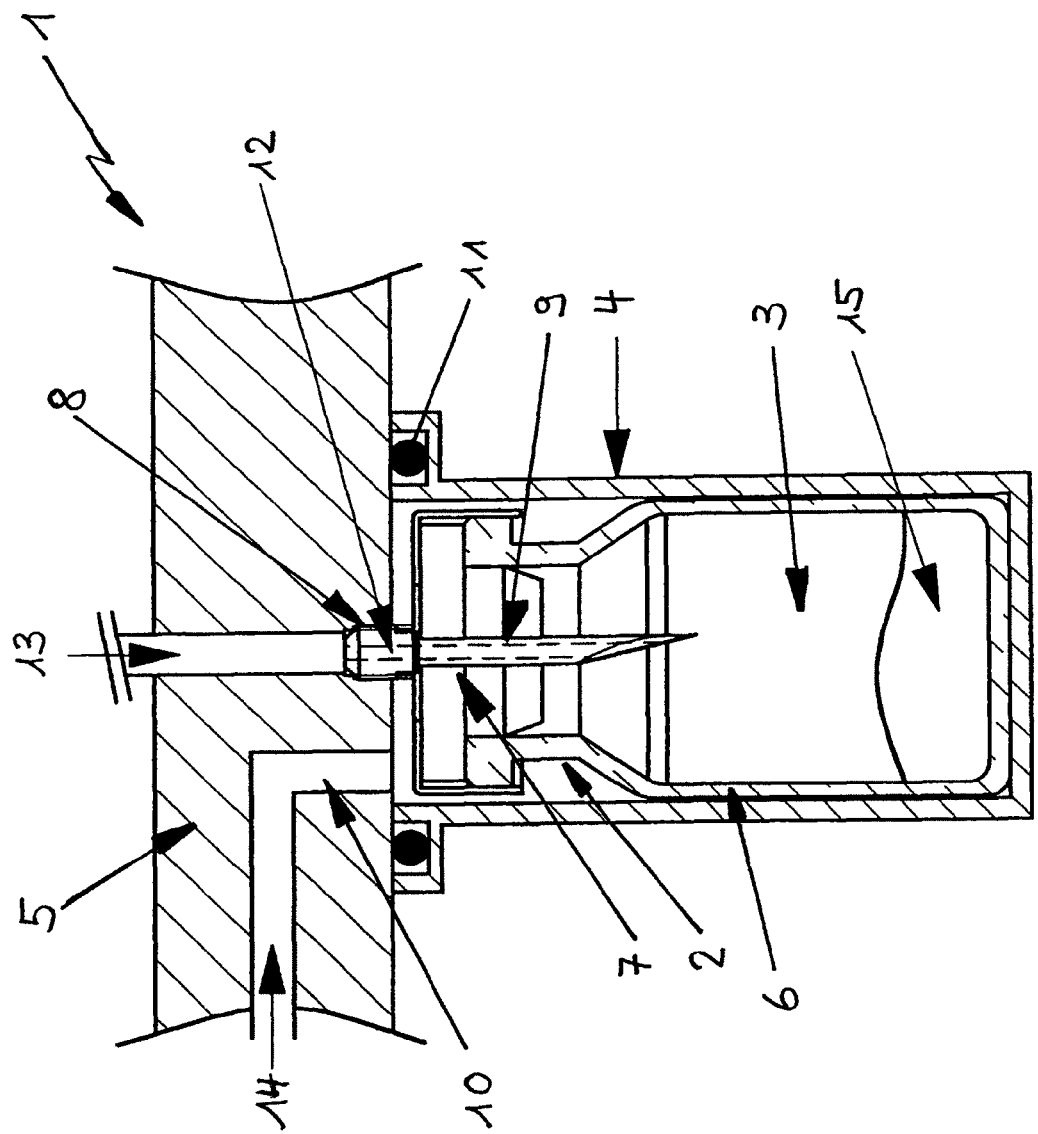

NEEDLE REACTOR

CROSS-REFERENCE TO RELATED APPLICATIONS

The present application is a U.S. National Stage of International Patent Application No. PCT/CH2009/000072 filed Feb. 20, 2009.

BACKGROUND OF THE INVENTION

1. Technical Field

The present invention concerns a reactor suitable for performing reactions with air sensitive and/or moisture sensitive substances, in particular catalysts. The present invention especially concerns autoclaves, i.e. reactors wherein syntheses may be carried out under pressure or in vacuum.

2. Background Art

Several reactors have already been proposed for performing reactions under exclusion of air and/or moisture and under pressure, e.g. for the synthesis of certain polymers.

One of the solutions of the state of the art concerns an autoclave with a septum provided at the autoclave directly, through which it may be filled with air sensitive and/or moisture sensitive substances by injection, followed by pressurizing. This embodiment has the advantage that it is cheap and can easily be realized. However, it also bears the disadvantage that injection cannot take place under pressure and that the whole autoclave has first to be rendered inert, i.e. air and/or moisture have to be removed, which is very time consuming.

In an alternative solution the whole reactor is placed in a glovebox, filled, closed and the reaction is performed either in the glovebox or out of it. This procedure has the advantage of an absolute exclusion of air and/or moisture, but also the disadvantages that a glovebox is needed and that performing a reaction in a glovebox is expensive and time-consuming.

Other reactors that are cheap and simple bear the disadvantage that the reaction medium cannot be fully shielded from contact with air and/or moisture. For example such reactors comprise a septum (pre-pierced) and are subsequently pressurized or they are provided with a check valve and are subsequently pressurized in a pressure vessel.

Thus, there is still a need for an improved reactor/autoclave that enables the performance of reactions under exclusion of air and/or moisture and under overpressure or reduced pressure/vacuum and that does not have the mentioned disadvantages.

SUMMARY OF THE EMBODIMENTS

The aim of the present invention was to provide an autoclave/reactor that enables the performance of reactions under exclusion of air and/or moisture and under overpressure or vacuum, that allows the addition of further reactants under overpressure or vacuum and is nevertheless cheap and easy to handle.

This aim is achieved by a multi-chamber reactor according to the present invention having an outer chamber and at least one inner chamber. The at least one inner chamber is formed by a reactor/liner, which is closed by a closure, in particular a septum or a disk that may be pierced with a needle, and the outer chamber is an autoclave. The autoclave is composed of an autoclave body and an autoclave cover that includes at least one needle comprising a needle wall with an inner and an outer surface and at least a first opening for the needle such that this at least one opening is sealed against the outer surface of the needle wall.

In the scope of the present invention a needle always means a hollow needle/cannula or a tube like body with at least one jacket (at least one needle wall), respectively. A "filled" needle like a sewing needle is termed a nail.

On the side of the reactor/liner, the needle may be blunt or—for an improved piercing with reduced violation of the closure—tapered.

The needle in the autoclave cover can either be arranged such that on the side of the reactor it extends over the autoclave cover so much that it pierces the closure upon closing the autoclave, or such that the needle is movably arranged in the autoclave cover, so that after closing the autoclave it can be moved towards the reactor and through the closure.

In a preferred embodiment, the multi-chamber reactor of the invention is designed such that between the at least one inner chamber and the outer chamber at least a partial equalization of pressure is guaranteed. This may e.g. be achieved in that the needle is designed such that it allows equalization of pressure between the inner chamber and the outer chamber, for example in that the needle has in at least a partial area a not totally impermeable wall, or in that the needle is a double-walled needle with an inner wall and an outer wall, in which the outer wall is not totally impermeable in at least a partial area. Upon use of the multi-chamber reactor, this partial area of the needle wall that is not totally impermeable is at least partially in contact with the outer chamber.

If a double-walled needle is used, it is preferred that the inner wall of the needle extends farther into the reactor than the outer wall. This allows optimal rinsing of the reactor content and optimal security with regard to the undesired penetration of foreign gases, in particular if the equalization of pressure between outer chamber and inner chamber in the area of the outer chamber is generated by a cheaper, less pure gas.

As an alternative to the generation of an equalization of pressures via a needle/cannula with an at least partially permeable wall, the equalization of pressure may also be achieved by means of a second opening, a second piercing in the closure. Such piercing may be performed using a piercing device, e.g. a nail or a needle, that needs not having a lasting connection through the autoclave cover and thus may be easily realized as far as sealing is concerned. After piercing, a nail is removed from the closure while a needle may be left in the closure resulting in a better defined opening.

In a further preferred embodiment, the multi-chamber reactor has at least a second opening, wherein said at least one second opening is in contact with the outer chamber. Said second opening is usually connected to a gas supply that supplies the outer chamber of the multi-chamber reactor with gas for pressure build-up. This direct gas supply to the outer chamber has two advantages. On the one hand, pressure build-up can be realized much faster, and on the other hand, expensive gas of high purity can be saved since such gas has only to be supplied to the inner chamber and this in amounts ensuring there a constant slight overpressure.

As an alternative or in addition, said one second opening can also be connected to a vacuum pump in order to perform reactions or to investigate reactions under reduced pressure. In these cases, only a minimal amount of inert gas is supplied through the needle into the inner chamber, just enough to ensure that upon fluctuation in the throughput of the vacuum pump no air and/or moisture may penetrate the inner chamber.

In an embodiment that enables operation under pressure as well as under vacuum, the autoclave may have two second openings, one coupled to a gas supply and a second one coupled to a vacuum pump.

Not only the first openings but also the second openings in the autoclave are preferably positioned in the autoclave cover. Usually they are provided with valves and preferably with pressure meters or flow meters and/or pressure regulators or flow regulators at the autoclave or within the supply pipes or drain pipes, respectively.

For performing complex reactions, the multi-chamber reactor may have at least two inlet openings per inner chamber each of them sealed against the outer surface of the needle wall. This enables the supply with two or more gases, for example one inert gas and one reactive gas, or one inert gas and one reaction solution etc.

An embodiment with 2 needles per reactor/liner may also serve to withdraw reaction medium with one of the needles.

The multi-chamber reactor of the invention may have one single inner chamber, e.g. for performing a reaction with a relatively large volume, or it may comprise several, usually at least three inner chambers in a rotationally symmetrical arrangement. Several inner chambers have the advantage that at least two reactions can be performed under as identical conditions as possible. The preferred minimal number of 3 results from the simultaneous performance of a blind sample or reference sample which is important in case of sensitive substances in order to ensure to the greatest extent possible that the results obtained are not due e.g. to undesired presence of air and/or moisture.

With this in mind it is also advantageous to provide the outer chamber with sensors that monitor the gas quality and/or the course of the reaction. Such sensors comprise temperature sensors, pressure sensors, spectrometric sensors or optical sensors, respectively, pH sensors, conductivity sensors etc.

In order to guarantee good mixing within the multi-chamber reactor, it is intended to provide the multi-chamber reactor with a mixing device, for example with a shaking plate or with an ultrasound generator or with one magnetic stirrer per inner chamber that is centered with regard to each inner chamber so that each inner chamber contains a magnetic stirring bar.

In addition, the inventive multi-chamber reactor may be provided with a heating module and/or a cooling module.

In addition to a cooling aggregate that is in contact with the autoclave and cools the chambers via the walls of the autoclave, also the at least one needle may be provided with a cooling such that it may serve as flow-through condenser.

The inventive multi-chamber reactor can be used alone or as module in a system. Such a system that comprises at least two multi-chamber reactors is characterized in that the multi-chamber reactors share at least one supply and/or at least one heating module and/or cooling module and/or at least one vacuum pump.

During the production of an inventive multi-chamber reactor great importance has to be attached to the sealing or the seal, respectively, of all lead-ins. This is achieved for example by using rubber gaskets, in particular silicon gaskets. As material for the autoclave any common autoclave materials are suitable, in particular high-quality steel types like austenitic stainless steels, nickel alloys, titanium etc.

By using a reactor/liner inside the autoclave, the autoclave material is not critical and thanks to the low pressure differences between inner chamber and outer chamber that have to be borne, almost any material may be used for the liner, for example plastics but also glass or metal. The closure of the reactor/liner preferably is of silicone, but may also be of another material that upon piercing seals well.

Thanks to the almost unlimited choice of the liner material, also reactions with aggressive and/or corrosive materials may be performed in the multi-chamber reactor.

To the greatest possible extent, the use of a liner prevents soiling of the autoclave and facilitates the cleaning. Since in general the liners are cheap, they can be purchased in such number that at least two autoclave fillings are available, so that the cleaning of one set—if the liners shall be cleaned at all—may take place while the second set is in the autoclave. This way, the multi-chamber reactor can be operated with almost no "down time".

The possibility to regulate the pressure in the inner chamber and in the outer chamber to a high extent independently from each other, allows the reactions to be performed in such a manner that no reaction medium or solvent vapor condenses in the outer chamber.

A further subject of the present invention is a method for performing a chemical reaction or an adsorption experiment with at least one air sensitive and/or moisture sensitive reaction component under pressure or vacuum and using an inventive multi-chamber reactor. This method comprises the steps that (a) one or more reaction components are filled into the reactor/liner under inert conditions, that (b) the reactor/liner is then closed by a closure under inert conditions, that (c) the at least one needle is rinsed with inert medium, that (d) during the rinsing of the needle with inert medium the closure is pierced with the needle, that (e) overpressure is generated within the reactor/liner by inert medium fed through the needle, that (f) between the at least one inner chamber and the outer chamber equalization of pressure is generated and that the reaction or the experiment is performed once the starting conditions are achieved.

Preferably the equalization of pressure between the inner chamber and the outer chamber is at least partially achieved through an opening for equalization of pressure in the closure or through a needle that has permeable wall in at least in an upper region that is at least in part in contact with the outer chamber. Thereby it is preferably ensured that within the inner chamber compared to the outer chamber always a slight overpressure exists that prevents the entering of possibly less pure gas from the outer chamber into the inner chamber. In a preferred embodiment the $\Delta p$ is in a range of 5 mbar to 2 bar, especially preferred in a range of 10 mbar to 100 mbar, in particular around about 10 mbar.

In order to accelerate the process, in particular the reaching of the reaction pressure, it is preferred to not achieve the whole pressure build-up by equalization of pressure between the inner chamber and the outer chamber, but by generating part of the pressure build-up in the outer chamber via direct supply of medium for equalization of pressure from outside the multi-chamber reactor directly into the outer chamber. If the criterion of overpressure in the inner chamber is met, as medium for equalization of pressure that is directly fed into the outer chamber, a cheaper, less inert gas may be used which may result in high cost savings.

Reactions and experiments that can be performed very well in the inventive multi-chamber reactor are high-pressure reactions as well as reactions under reduced pressure, i.e. at pressures below 1 bar. Such reactions are for example polymerization reactions, like the productions of polyolefins, e.g. polyethylene (PE), polypropylene (PP) or PE-PP-mixed polymers using air sensitive and/or moisture sensitive catalysts, but also adsorption/desorption experiments.

Depending on the number of inlets and/or outlets (needles) to an inner chamber it is possible to perform one-step reactions or multiple-step reactions or to control them by sample drawing.

Having reached the desired pressure conditions, a reaction may be started by adding through the at least one needle a substance essential for the reaction and/or by temperature enhancement etc.

Drawing of liquid samples may for example be performed in that the sample is pressed through the needle due to the overpressure in the reactor/liner with regard to the atmospheric pressure existing outside the multi-chamber reactor. The sample size can be determined by adjusting the needle level (pressing out the liquid until its level corresponds to the level of the point of the needle).

BRIEF DESCRIPTION OF THE DRAWINGS

Further embodiments, advantages and applications of the invention become clear if consideration is given to the dependent claims and the following description based on the FIGURE. Therein the FIGURE shows a cross-section through a two-chamber reactor.

DETAILED DESCRIPTION OF THE EMBODIMENTS

The inventive multi-chamber reactor 1, according to the FIGURE, includes a two-chamber reactor having an outer chamber 2 and at least one (in the FIGURE shown is one) inner chamber 3 comprising a reaction medium 15. While the exemplary embodiment only illustrates a single inner chamber 3, it is understood that more than one inner chamber 3 can be utilized without departing from the spirit and scope of the embodiments of the invention. The outer chamber 2 is delimited by a pressure resistant outer jacket or autoclave, formed by an autoclave body 4 and an autoclave cover 5. Arranged within this outer chamber 2 is at least one reactor or liner 6 that is closed with a closure 7, in particular a septum or a disc that may be pierced. Arranged in the autoclave cover 5 are a first opening 8 with a needle 9 and a second opening 10. The sealing between the autoclave body 4 and the autoclave cover 5 is achieved by usual sealing elements like a gasket 11 and/or sealing paste. The outer wall of the needle 9 is sealed against the first opening 8 by a gasket (not shown) and/or a thread lock 12. On the side of the environment, the needle is connected to gas supply and/or a reaction medium supply 13. Further, on the side of the environment, the second opening is also coupled to a gas supply and/or a vacuum pump 14.

While the present application describes preferred embodiments of the invention, it is clearly pointed to the fact that the invention is not limited to them but may also be embodied otherwise within the scope of the following claims.

The invention claimed is:

1. A multi-chamber reactor comprising:
an autoclave forming an outer chamber and comprising an autoclave body and an autoclave cover;
a reactor/liner forming at least one inner chamber and being closable via a closure;
the autoclave cover comprises: at least one needle having a needle wall with an inner and an outer surface; and a first opening for the needle,
wherein a seal is formed between the first opening and the outer surface of the needle.

2. The multi-chamber reactor of claim 1, wherein the at least one inner chamber and the outer chamber are structured and arranged to secure at least a partial equalization of pressure between the at least one inner chamber and the outer chamber.

3. The multi-chamber reactor of claim 1, wherein the needle is arranged to protrude from the autoclave cover to pierce the closure upon closing the autoclave cover.

4. The multi-chamber reactor of claim 1, wherein the needle in the autoclave cover is arranged to be movable toward the reactor/liner and through the closure when the autoclave cover has been closed.

5. The multi-chamber reactor of claim 1, wherein the needle is structured and arranged to equalize the pressure between the inner chamber and the outer chamber.

6. The multi-chamber reactor of claim 5, wherein the needle wall is not entirely impermeable in at least a part thereof.

7. The multi-chamber reactor of claim 5, wherein the needle is a double-walled needle having an inner wall and an outer wall, and the outer wall includes at least a part that is not impermeable.

8. The multi-chamber reactor of claim 7, wherein the inner wall of the needle is structured to extend farther into the reactor than the outer wall.

9. The multi-chamber reactor of claim 5, wherein the needle is a single-walled needle and the needle wall is an impermeable wall, and the closure comprises a piercing remote from a needle piercing point.

10. The multi-chamber reactor of claim 9, further comprising a further needle coupled to the autoclave cover that is structured and arranged to generate the piercing.

11. The multi-chamber reactor of claim 1, wherein the autoclave further comprises at least one second opening that is structured and arranged to be in contact with the outer chamber.

12. The multi-chamber reactor of claim 11, wherein the autoclave further comprises two second openings, wherein a first of the second openings is structured and arranged to feed gas to the autoclave and a second of the second openings is structured and arranged to discharge gas from the autoclave.

13. The multi-chamber reactor of claim 1, further comprising valves coupled to at least one of at the first openings and the second openings in the autoclave that are structured and arranged to regulate an opening and closing the at least one of the first openings and the second openings, which are respectively connected to source lines and drain lines.

14. The multi-chamber reactor of claim 1, wherein the at least one inner chamber comprises a plurality of inner chambers, and each inner chamber comprises at least two first openings sealed against the outer surface of the needle wall.

15. The multi-chamber reactor of claim 1, the at least one inner chamber comprises a single inner chamber.

16. The multi-chamber reactor of claim 1, the at least one inner chamber comprises at least 3 inner chambers structured and arranged in a rotationally symmetric arrangement.

17. The multi-chamber reactor of claim 1, the at least one inner chamber comprises a plurality of inner chambers and each inner chamber includes a magnetic stirrer centered in relation to the inner chamber.

18. The multi-chamber reactor of claim 1 being removably mounted on a shaking plate.

19. The multi-chamber reactor of claim 1, further comprising at least one of a heating module and a cooling module.

20. The multi-chamber reactor of claim 1, wherein the closure comprises one of a septum or a disk piercable with a needle.

21. A device comprising at least two multi-chamber reactors according to claim 1, wherein the multi-chamber reactors share at least one of an inlet, a heating module, a cooling module, and a vacuum pump.

22. A method for performing a chemical reaction or an adsorption experiment with at least one reaction component that is at least one of air sensitive and moisture sensitive under overpressure or reduced pressure/vacuum in a multi-chamber reactor of claim 1, the method comprising:

filling the reactor/line under inert conditions with one or more reaction components;

closing the reactor/liner under inert conditions with the closure;

rinsing the at least one needle with an inert medium;

during the rinsing, piercing the closure with the needle;

generating an overpressure within the reactor/liner via inert medium supplied through the needle;

equalizing pressure between the at least one inner chamber and the outer chamber; and performing the reaction or the experiment once the pressure between the at least one inner chamber and the outer chamber has been equalized.

23. The method of claim 22, wherein the equalization of pressure between inner chamber and outer chamber is effected at least in part via at least one of:

an opening for in the closure; and through at least a permeable part of the needle wall.

24. The method of claim 23, wherein the permeable part of the needle wall is at least arranged in an upper area that is at least partially in contact with the outer chamber.

25. The method of claim 22, wherein the equalization of pressure between inner chamber and outer chamber comprises supplying a medium for equalizing pressure from outside the reactor into the outer chamber through a second opening in the outer chamber.

26. The method of claim 22, wherein the pressure in the inner chamber is always higher than a pressure in the outer chamber by a $\Delta p$ in a range of 5 mbar to 2 bar.

27. The method of claim 26, wherein $\Delta p$ is in a range of 10 to 100 mbar.

28. The method of claim 26, wherein $\Delta p$ is about 10 mbar.

* * * * *